Sept. 17, 1968  J. KÄGI  3,402,102
NUCLEAR REACTOR PLANT
Filed May 31, 1966  5 Sheets-Sheet 1

Inventor:
JAKOB KÄGI
BY
Kenyon & Kenyon
ATTORNEYS

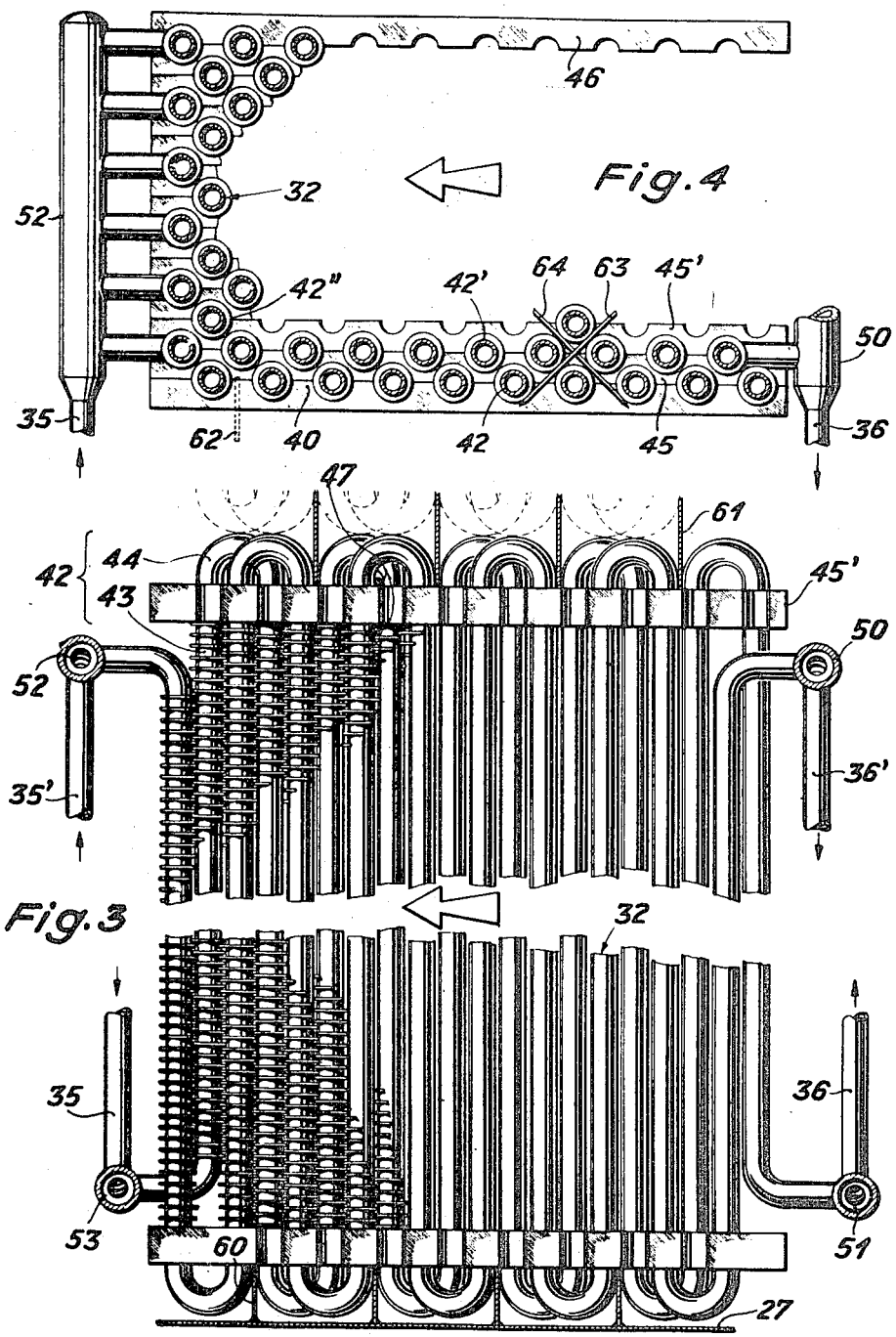

Sept. 17, 1968   J. KÄGI   3,402,102
NUCLEAR REACTOR PLANT
Filed May 31, 1966   5 Sheets-Sheet 3
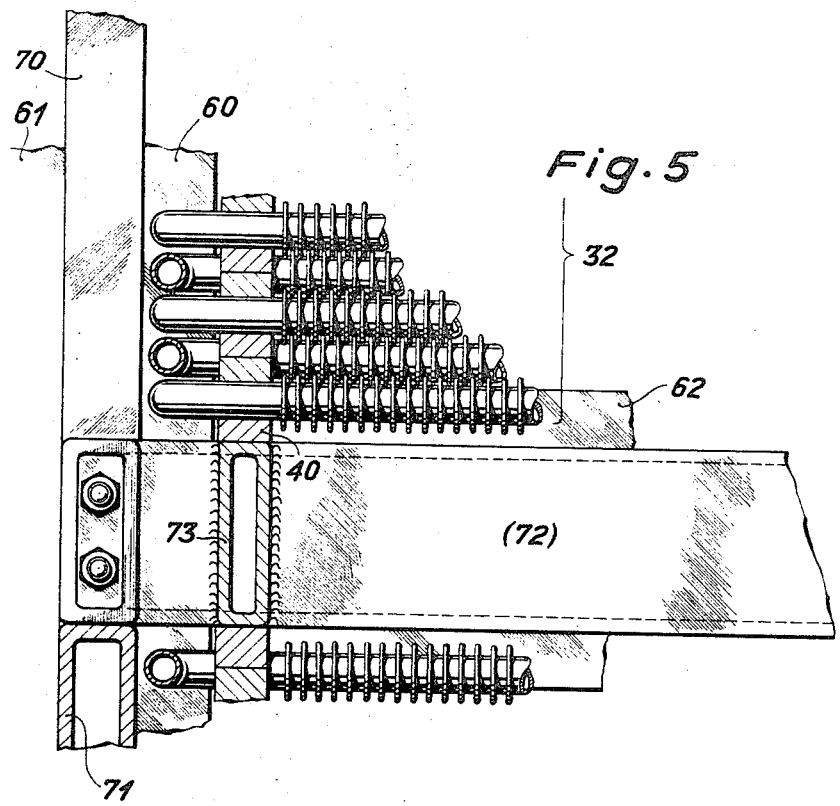
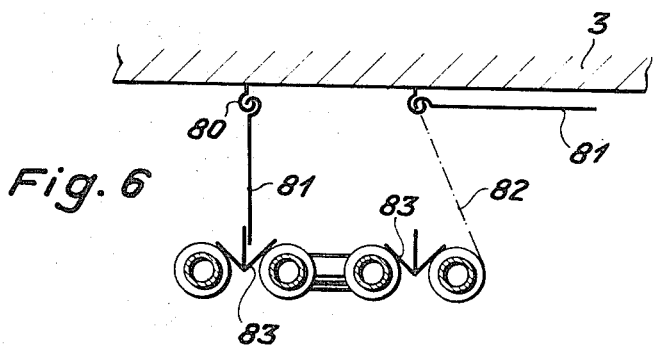
Inventor:
JAKOB KÄGI
BY Kenyon & Kenyon
ATTORNEYS

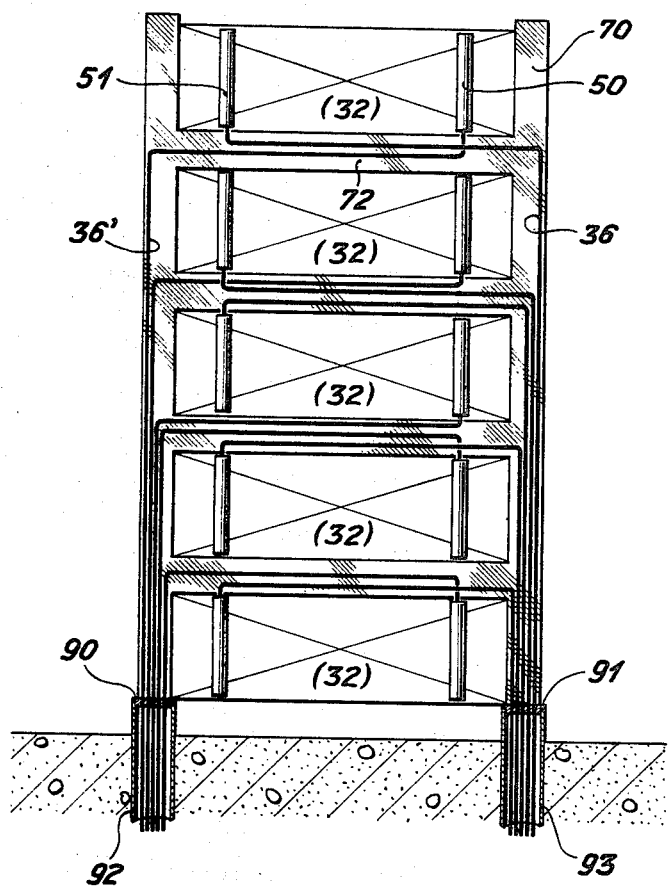

United States Patent Office 3,402,102
Patented Sept. 17, 1968

3,402,102
NUCLEAR REACTOR PLANT
Jakob Kägi, Wiesendangen, Switzerland, assignor to Sulzer Brothers, Limited, Winterthur, Switzerland, a Swiss corporation
Filed May 31, 1966, Ser. No. 554,079
Claims priority, application Switzerland, June 25, 1965, 8,945/65
13 Claims. (Cl. 176—59)

ABSTRACT OF THE DISCLOSURE

The steam generators are positioned below the shield block and are spaced about a central chamber which receives heated coolant gas from the nuclear reactor and distributes the heated gas transversely through the steam generators. The generators have pipes disposed horizontally to form heat exchanger surfaces with the heated coolant gas.

---

This invention relates to a nuclear reactor plant. More particularly, this invention relates to a nuclear reactor plant having a gas cooled reactor and a steam generator disposed in operative relation to each other. Still more particularly, this invention relates to a nuclear reactor plant having a steam generator which directs the flow of reactor cooling gas in a substantially horizontal direction therethrough from a centrally located distributor chamber.

Heretofore, nuclear reactor plants have been known in which the cooling gas for the nuclear reactors has flowed through steam generators in the same direction as that through which it has flown through the reactor. The development of this construction has been based on the idea of constructing the steam generator from identical units which could be prefabricated in the workshop and subsequently erected in side-by-side relationship at the operating site. In addition, endeavours have been made to achieve the best possible filling factor utilization of the circular cross sectional space available below the reactor on the assumption that the entire space thus occupied would become a minimum. The length of the flow on the gas side as well as the required steam generating volume have therefore been determined from the cross section of the steam generator in relation to the direction of gas flow since the cross section has been substantially predetermined. The relatively high unit towers which have already been proposed and which are erected on a grating or on stilts have been the logical consequence of this design. The length of the pipe limbs and therefore the number of bends have thus been determined by the length of a single steam generator pipe, by the height of the towers and by the longitudinal subdivision of the pipes within the units provided only one pipe extends in coil form in one pipe plane.

Accordingly, it is an object of the invention to direct a flow of coolant through a steam generator of a nuclear reactor plant in a horizontal direction.

It is another object of the invention to direct a flow of coolant through a steam generator of a nuclear reactor plant in a direction transverse to the flow of the coolant from a nuclear reactor.

It is another object of the invention to reduce the number of bends required in pipe coils of the steam generator of a gas cooled nuclear reactor plant.

It is another object of the invention to shorten the length of coolant flow through the steam generator of a nuclear reactor plant.

It is another object of the invention to increase the cross section of a steam generator of a nuclear reactor plant in relation to the direction of coolant gas flow.

It is another object of the invention to form a steam generator of a plurality of horizontally disposed pipe coils stacked in superjacent pattern.

It is another object of the invention to form a steam generator of a plurality of bundles of pipe coils arranged in a superjacent daylight pattern.

Generally, the invention is based on the realization that by reorientating the coolant flow direction into a horizontal plane as well as departing from the previous practice of filling the cross section of the space below the reactor as much as possible, that is, by having an apparent waste of space, the cross section of the steam generator is increased in relation to the direction of the gas flow so that the length of coolant flow is shortened thereby substantially reducing the number of coil turns required. This also diminishes the number of pipe bends and therefore the number of welding points so that the construction of the steam generator is made substantially cheaper.

In working out the design details of this concept it has been found that the waste of space below the reactor is only apparent and that the collector and distributor spaces, which are required in all cases and were hitherto disposed below or above the steam generator, could be accommodated at the level of the steam generator. Moreover, the absence of bends results in a substantial gain of space so that, on balance, the construction of the invention is more favorable with respect to space.

Additionally, where a wall which extends into a cylindrical surface is provided between a reactor and a pressure vessel of a nuclear reactor plant according to the invention to allow the cooling gas to flow between the cylindrical wall and the pressure vessel and where the cylindrical wall extends beyond the steam generator the wall can be employed as a supporting member as well as a guide for the cooled gas.

The steam generator units of the invention are preferably constructed of pipe coils arranged in a superjacent pattern to extend along horizontal planes. This achieves particularly simple assembly and the most efficient means of support. This construction also minimizes the transverse subdivision which is a particularly important feature for achieving a good thermal transfer and a compact construction. Further, where the pipe coils are supported by spacer strips disposed in a superjacent pattern, the strips can be advantageously employed for preventing the gas stream from striking the bends of the pipe coils.

Additionally, it may be convenient to combine a stack of pipe coils or panels into a bundle so that several of such bundles can be disposed in a superjacent pattern to form a steam generator unit. This subdivision into bundles which can be individually transported by road or rail enables the units to be substantially manufactured within the workshop. The bundles can thus be retained in a rack or in a box, at least for transportation purposes.

Several other advantages are obtained when the bundles are not stacked directly superjacently in the plant but are disposed in a supporting rack in several daylights in a construction akin to drawers. For example, such allows the bundles to be made of lighter weight since they are required to carry only their own dead weight. Further, where chicane baffles are fitted between adjacent bundles and/or adjacent boundary walls, simple bridging can be employed over the spaces required to absorb expansion of the components of the plant. Also, hinged chicane baffles are preferably fitted on the ceiling above the upper bundle to afford rapid access into the pipe coils for the purpose of repairs.

A further feature of the invention is that the pipes of successive pipe coils of each bundle are alternately connected by connecting lines which extend through a pressure tight wall to one each of at least two distributors and to one each of an identical number of collectors. With this construction it is possible, in the event of a leakage of one pipe, to isolate from the system the two connecting lines to the distributor and collector, to which the affected pipe is connected. This enables leakage to be avoided without rendering the affected bundle ineffective.

These and other objects and advantages of the invention will become more apparent from the following detailed description and appended claims taken in conjunction with the accompanying drawings in which:

FIG. 3 illustrates a plan view of a bundle of pipe coils;

FIG. 4 illustrates a partial sectional view of the bundle of pipe coils of FIG. 3;

FIG. 5 illustrates a connection of a pair of superjacent bundles of pipe coils to a supporting frame;

FIG. 6 illustrates the relative positions of hinged chicane baffles between the uppermost bundles of pipe coils and a ceiling;

FIG. 7 illustrates a diagrammatic view of the inlet side of a steam generator unit constructed in accordance with the invention.

Figures 1, 2:
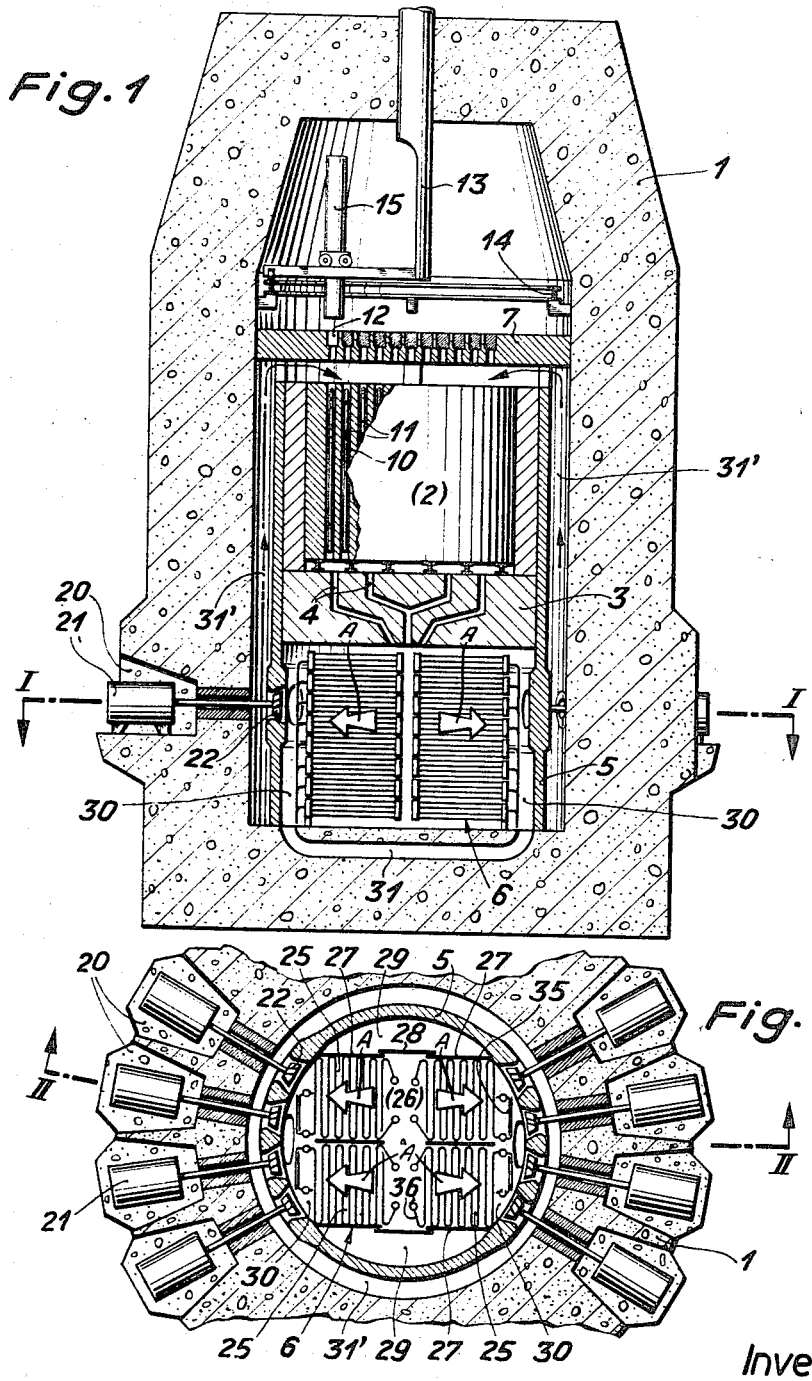
FIG. 1 illustrates a cross sectional view taken at line II—II of FIG. 2 of a nuclear power plant constructed according to the invention.
FIG. 2 illustrates a cross sectional view taken on line I—I of FIG. 1 of the steam generator of the nuclear power plant.

Referring to FIGS. 1 and 2, the nuclear reactor plant includes a concrete pressure vessel 1 which houses a nuclear reactor 2 therein on a floor 3 which also serves to provide the lower shielding and which is penetrated by bent gas ducts 4 in alignment with the reactor 2. In addition, the pressure vessel 1 has a cylindrical wall 5 which surrounds the reactor 2 and extends to the floor of the pressure vessel 1 and a steam generator 6 which is supported on the floor of the pressure vessel 1 below the shielding floor 3 in spaced relation to the wall 5. The steam generator 6 consists of a large number of metal pipes connected in parallel on the water side and arranged in horizontal planes to carry a positive flow. The cylindrical wall 5 extends upwardly to the upper edge of the nuclear reactor 2 and joined through short supports to an upper shielding 7.

The nuclear reactor 2 contains ducts 10 in which rods 11 of fissile material are housed in alignment with recessed holes 12 in the upper shielding 7 which are normally closed by shielding plugs. The space above the upper shielding 7 accommodates a polar coordinate traversing gear which carries a changeover mechanism 15 for the fissile material rods 11; the traversing gear being secured on a central shaft 13 and on a peripherally extending rail 14 for rolling thereon.

The concrete pressure vessel 1 is also provided with recesses 20 at the level of the steam generator 6 for housing motors 21 which drive gas blowers 22 through rotors located in suitable openings in the cylindrical wall 5.

The steam generator 6 consists of four units 25 which are disposed on the two longitudinal sides of a rectangular distributor chamber 26 with the side walls 27 of the elements 25 joined to the cylindrical wall 5 so as to form a sealed joint. In addition, the two side walls 27 on each side of the generator 6 are connected over the width of the distributor chamber 26 by walls 28; however, this connection is not made gas-tight so that the segment shaped chamber 29, formed in this manner between the wall 5 and generator 6, will have the same pressure as that which prevails in the chamber 26 but will have the gas therein stationary. Also, two segment shaped collector chambers 30 are formed along the exit sides of the steam generator units 25 for termination of the inlet eyes of the gas blowers 22. The two collector chambers 30 are communicated together by a duct 31 for the purpose of pressure equalization, particularly in the event of a failure of a gas blower.

In operation, the reactor cooling gas, for example $CO_2$, is pumped by the gas blowers 22 from the collector chambers 30 into an annular duct 31' located between the cylindrical wall 5 and the pressure vessel 1, the gas flowing upwardly through the duct. The cooling gas then flows to the upper ends of the ducts 10 in the reactor directly below the upper shielding 7. The gas flows through the ducts 10 and thus cools the rods 11 of fissile material housed therein while becoming heated. The heated gas enters into the distributor chamber 26 through the gas ducts 4 and from there, while giving up heat, flows horizontally in the direction indicated by the arrows A through the units 25 of the steam generator 6 after which the flow is recombined in the collector chambers 30.

The units 25 are fed through pipelines 35 with pressurized water which is preheated, evaporated, and if necessary superheated, in passing through the pipes of the units 25. The resulting steam leaves the steam generator through connecting lines 36 for distribution to steam-using appliances preferably steam turbines, through suitable pipelines (not shown). Individual steam generator units or all of the steam generator units can be provided exclusively or additionally for intermediate superheating of the steam.

Referring to FIGS. 3 and 4, a steam generator unit 25 is formed of a plurality of pipe bundles 32. Each pipe bundle 32 has a first pipe coil 42 having circularly or helically finned limbs 43 and reversing bends 44 which rests in a horizontal plane on supports 40 within saddle-shaped cut-outs. Spacer strips 45 are positioned above the supports 40 to support a second pipe coil 42' having the same number of turns as the pipe coil 42 but being offset in relation thereto. Additional spacer strips 45' and pipe coils 42" are stacked above pipe coil 42' in similar fashion. The reactor cooling gas flows in the direction indicated by the arrow through the pipe bundle 32. Two collectors 50, 51 are located on the inlet side of the pipe bundle and extend over the height of the pipe bundles, the collector 51 being connected with the end of all pipe coils in the odd-numbered daylights, while the collector 50 is connected with the ends of the pipe coils in the even-numbered daylights. Appropriate steam distributors 52 and 53, which are also connected to every second pipe run, are provided on the gas exit side. With this construction it is possible, for example, in the event of leakage from the second pipe coil, to blank off the connecting lines 35' and 36' leading to the distributor 52 and collectors 50 so that all pipe coils in the even-numbered daylights are shut down. Although the temperature of the gas leaving the affected bundle rises it nevertheless remains within permissible limits. Alternatively, by allowing for a larger technical effort the number of collectors can be increased so that by shutting down two connection lines, every third or fourth pipe coil of the affected bundle can be shut down.

Since the length of the pipe limbs 43 is made as long as possible it may be found convenient to support the pipe coils not only directly adjacent to the pipe bends but also at one or more positions along the pipe limb length. This is achieved by using additional rows of supports 40 and spacer strips 45 (not shown). A cover strip 46 (FIG. 4) is advantageously provided above the uppermost pipe coil of each bundle and joined to the support 40 by frictional engagement of tie rods 47 indicated in section in FIG. 3.

The side wall 27 of the bundle 32 or the unit 25 is provided with a plurality of chicane baffles 60 which extend from the side wall 27 into the turns between the pipe bends so that the gas flow rate through the pipe bend section is greatly reduced and adapted to the thermal transfer rate which is limited at that position. Additionally, spacer plates 61 are provided at the end of the bundle 32 opposite the side wall 27 to extend from the stack of spacer strips 45 of the bundle 32 to the spacer strips of an adjacent unit between the bends of that unit (shown in dotted lines in FIG. 3). Chicane baffles 62 may also be provided below the bundle 32. This construction is appropriate where the bundles do not rest on each other without intermediate spaces. Further, damper rods 63, 64 (FIG. 4) are inserted at an angle into the spaces between the pipe limbs 43 to dampen any relative movement of the pipe limbs to a permissible extent.

Referring to FIG. 5, where it is desired, for example for transportation reasons, to adopt a lightweight construction for the bundles 32, separate carrying frames can be provided to carry the bundles so that the bundles do not have to carry any heavy loads. For example, such a carrier frame includes a vertical girder 70 joined to an adjacent girder through a box girder 71 which extends at right angles to the plane of the drawing as well as horizontal box girders 72 which connect the vertical girder 70 at right angles to the flow direction of the cooling gas with a further vertical girder (not shown). The supports 40 on which the bundles are erected as indicated in FIGS. 3 and 4, rest on the supporting girders 73. Chicane baffles 60 (61, respectively) and 62 are also provided at this position, the baffles 62 extending as far as the spaces between the bundle located below the girder 72.

Referring to FIG. 6, the zone located directly below the shielding floor 3, the underside of which forms a ceiling, contains a certain amount of required space between the uppermost bundle and the ceiling for repair purposes. The ceiling 3 is provided with sectioned rods 80 of a spiral section into which hinged chicane baffles 81 are engaged. The lower edge of the chicane baffles rests directly, preferably at an angle, on pipe limbs, as indicated by the dash-dot line 82; however, the baffles may also abut against webbed angle sections 83 located between pairs of pipe limbs.

Referring to FIG. 7, the bent connecting lines 36, 36' at the inlet side of a steam generator unit 25 extend from the collectors 50, 51 through two pipe endplates 90, 91. The pipe endplates 90, 91 are located on pipes 92 and 93, respectively, which are concreted into the floor of the concrete pressure vessel and which, together with the bundles of connecting pipes, pass through the aforementioned floor of the concrete vessel.

Figure 8:
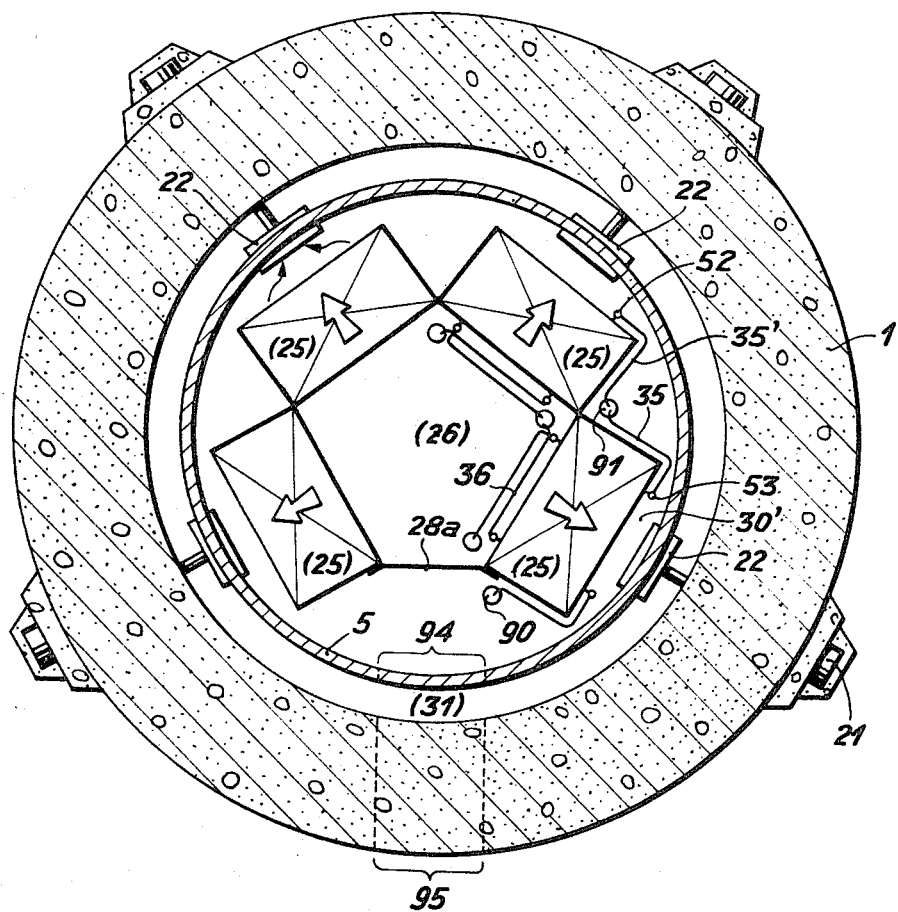
FIG. 8 illustrates a cross sectional view of a modified steam generator having the steam generator units arranged in a pentagonal pattern.

Referring finally to FIG. 8, in an alternative form, a reactor plant can have the units of the steam generator erected on four sides of an irregular pentagon with short side of the pentagon closed by a wall 28a. In order to provide the collector chambers 30' with the necessary width, spaces are left between the outer corners of the units 25 and the cylindrical wall 5 for the purpose of permitting pressure equalization in the event of failure of a gas blower 22, and for acting in place of the duct 31 shown in FIG. 1 to prevent flow in the reverse direction through the unit 25 which is allocated to the affected blower.

The connecting lines 35, 35' which lead from the distributors 52 and 53 to the pipe endplates 90, 91 pass through the spaces between the cylindrical wall and the units 25 into the spaces adjacent to the narrow sides of the units in which there is sufficient room to accommodate the pipe endplates 90, 91.

The chamber 26 which is considerably enlarged compared with the modification indicated in FIG. 2 greatly facilitates any repair work which may be necessary in the pipe coil in that, if necessary, entire bundles may be withdrawn in the manner of a drawer or may if necessary be removed from the reactor plant through lockable openings 94, 95.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A nuclear reactor plant comprising:
a pressure vessel,
a nuclear reactor disposed in said pressure vessel,
a steam generator disposed within said pressure vessel in vertical relation to said nuclear reactor said steam generator including at least two steam generator units disposed in spaced horizontal relation to define a distributor chamber therebetween for collecting a cooling gas passing through said steam generator and for distributing the collected cooling gas across the cross section of each of said steam generator units in a horizontal direction,
first means for circulating the cooling gas through said nuclear reactor and through said steam generator, and
second means for directing the cooling gas through said steam generator in a direction transverse to the direction of the flow of the cooling gas passing into said steam generator.

2. A nuclear reactor plant as set forth in claim 1 wherein each of said steam generator units includes a plurality of pipe coils disposed in horizontal planes and stacked in a superjacent pattern.

3. A nuclear reactor plant as set forth in claim 2 wherein a plurality of spacer strips are positioned between said pipe coils for supporting the upper pipe coils on the lower pipe coils.

4. A nuclear reactor plant as set forth in claim 2 wherein each of said pipe coils includes a plurality of rectilinearly extending limbs, each of said limbs having a plurality of radially extending fins thereon.

5. A nuclear reactor plant as set forth in claim 2 wherein said plurality of pipe coils are arranged in bundles of pipe coils, said bundles being arranged in a superjacent pattern.

6. A nuclear reactor plant as set forth in claim 6 which further comprises a supporting frame for positioning said bundles thereon in a plurality of daylights in drawer fashion.

7. A nuclear reactor plant as set forth in claim 1 wherein each of said steam generator units includes a plurality of bundles of horizontally disposed pipe coils for the passage of water therethrough, at least two distributors operatively connected to alternate pipe coils of each of said bundles for delivery of water thereto, and at least two collectors operatively connected to opposite ends of said alternate pipe coils for collecting heated water therefrom.

8. A nuclear reactor plant as set forth in claim 7 wherein a plurality of connecting lines are connected to each of said distributors and collectors of a respective bundle whereby one of said bundles is adapted to be isolated from the other of said bundles of a steam generator unit by blanking off a respective pair of connecting lines.

9. A nuclear reactor plant as set forth in claim 7 which further comprises a plurality of chicane baffles between adjacent bundles of pipe coils.

10. A nuclear reactor plant as set forth in claim 9 which further comprises a plurality of hinged chicane baffles hingedly secured between the uppermost bundle of said bundles of pipe coils and said nuclear reactor.

11. A nuclear reactor plant as set forth in claim 1 wherein said units are spaced relative to each other to provide a zone for dismantling of said units therein.

12. A nuclear reactor plant comprising:
a pressure vessel,
a nuclear reactor disposed in said pressure vessel,
a steam generator disposed within said pressure vessel in vertical relation to said nuclear reactor,
first means for circulating the cooling gas through said nuclear reactor and through said steam generator, said first means including a cylindrical wall surrounding said nuclear reactor and said steam generator in spaced relation to said steam generator and said pressure vessel, said wall having access openings therein communicating first spaces between said steam generator and said wall with a second space between said wall and said pressure vessel and said second space with a third space above said nuclear reactor, and second means for directing the cooling gas through said steam generator in a direction transverse to the direction of the flow of the cooling gas passing through said steam generator.

13. A nuclear reactor plant comprising:
a pressure vessel,
a nuclear reactor disposed in said pressure vessel,
a steam generator disposed within said pressure vessel in spaced relation to said nuclear reactor, said steam generator including at least two steam generator units disposed in spaced relation to define a distribution chamber therebetween for collecting a cooling gas passing into said steam generator and for distributing the collected cooling gas across the cross section of each of said steam generator units,
first means for circulating a cooling gas through said nuclear reactor and said steam generator,
and second means for directing the cooling gas outwardly from said distribution chamber through each of said steam generator units across said steam generator units substantially transverse to an axis which connects the geometric centers of the nuclear reactor and of the distribution chamber.

References Cited

UNITED STATES PATENTS

| | | | |
|---|---|---|---|
| 3,104,653 | 9/1963 | Taylor | 176—60 |
| 3,110,288 | 11/1963 | Worley | 176—60 |
| 3,164,527 | 1/1965 | Brunner | 176—59 |
| 3,180,408 | 4/1965 | Grotz et al. | 176—60 |
| 3,249,507 | 5/1966 | Gondoin et al. | 176—59 |
| 3,266,999 | 8/1966 | Wood et al. | 176—59 |
| 3,267,906 | 8/1966 | Deighton | 176—65 X |
| 3,296,082 | 1/1967 | Lemesle et al. | 176—59 |
| 3,297,542 | 1/1967 | Costes | 176—59 |

REUBEN EPSTEIN, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,102            September 17, 1968

Jakob Kägi

It is certified that error appears in the above identified patent and that said Letters Patent are hereby corrected as shown below:

Column 6, line 36, claim reference numeral "6" should read -- 5 --.

Signed and sealed this 3rd day of February 1970.

(SEAL)
Attest:

Edward M. Fletcher, Jr.          WILLIAM E. SCHUYLER, JR.
Attesting Officer                Commissioner of Patents